(12) United States Patent
Inagaki et al.

(10) Patent No.: US 9,963,082 B2
(45) Date of Patent: May 8, 2018

(54) HITCH CARRIER

(71) Applicant: CAR MATE MFG. CO., LTD., Tokyo (JP)

(72) Inventors: Kiyotaka Inagaki, Tokyo (JP); Wataru Ishida, Tokyo (JP); Hideaki Okano, Tokyo (JP)

(73) Assignee: CAR MATE MFG. CO., LTD., Tokyo (JP)

( * ) Notice: Subject to any disclaimer, the term of this patent is extended or adjusted under 35 U.S.C. 154(b) by 0 days. days.

(21) Appl. No.: 15/125,694

(22) PCT Filed: Feb. 24, 2015

(86) PCT No.: PCT/JP2015/000922
§ 371 (c)(1),
(2) Date: Sep. 13, 2016

(87) PCT Pub. No.: WO2015/155921
PCT Pub. Date: Oct. 15, 2015

(65) Prior Publication Data
US 2017/0001573 A1    Jan. 5, 2017

(30) Foreign Application Priority Data

Apr. 8, 2014   (JP) ................................ 2014-079753

(51) Int. Cl.
*B60R 9/10*      (2006.01)
*B60R 9/06*      (2006.01)
*B62H 3/02*      (2006.01)

(52) U.S. Cl.
CPC .................. *B60R 9/10* (2013.01); *B60R 9/06* (2013.01); *B62H 3/02* (2013.01)

(58) Field of Classification Search
CPC ......... Y10S 224/924; B60R 9/10; B60R 9/08; B62H 3/00; B62H 3/02; B62H 3/12
(Continued)

(56) References Cited

U.S. PATENT DOCUMENTS 5,067,641 A * 11/1991 Johnson .................... B60R 9/06
                                                        224/501
5,259,542 A * 11/1993 Newbold .................. B60R 9/06
                                                        224/324
(Continued)

OTHER PUBLICATIONS

May 12, 2015 International Search Report issued in International Patent Application No. PCT/JP2015/000922.
(Continued)

*Primary Examiner* — Scott McNurlen
(74) *Attorney, Agent, or Firm* — Oliff PLC

(57) ABSTRACT

Provides a hitch carrier that is highly versatile for a bicycle that is loadable and that ensures stable loading of a bicycle. A hitch carrier for loading a bicycle including a frame that includes a top tube, a down tube, and a sheet tube, includes a first arm engaged with a first cradle including a supporting portion that supports the top tube, a second arm engaged with a second cradle including a supporting portion that supports the down tube, and a post supporting in a cantilever manner both the first arm and the second arm separated in a vertical direction. Fastening belts are disposed on the first cradle and the second cradle to fasten the top tube and the down tube, respectively.

3 Claims, 7 Drawing Sheets

(58) Field of Classification Search
USPC ............... 224/924, 502, 504, 497, 505–509
See application file for complete search history.

(56) References Cited

U.S. PATENT DOCUMENTS

| | | | | |
|---|---|---|---|---|
| 5,558,261 | A | * | 9/1996 | Hedeen .................... B60R 9/10 |
| | | | | 224/42.13 |
| 5,573,165 | A | | 11/1996 | Bloemer et al. |
| 6,386,407 | B1 | | 5/2002 | Erickson et al. |
| 6,431,423 | B1 | | 8/2002 | Allen et al. |
| 6,616,023 | B1 | * | 9/2003 | Dahl ....................... B60R 9/048 |
| | | | | 224/324 |
| 8,235,268 | B2 | | 8/2012 | Sautter et al. |
| 8,336,747 | B2 | * | 12/2012 | Bogoslofski .............. B60R 9/10 |
| | | | | 224/534 |
| 2014/0027484 | A1 | * | 1/2014 | Loken ..................... B60R 9/06 |
| | | | | 224/497 |
| 2014/0151421 | A1 | | 6/2014 | Loken |

OTHER PUBLICATIONS

Sep. 26, 2017 Office Action issued in Japanese Patent Application No. 2014-079753.

* cited by examiner

HITCH CARRIER

TECHNICAL FIELD

The present invention relates to a carrier for loading a bicycle, in particular, to a hitch carrier for loading a bicycle on a rear of a vehicle.

BACKGROUND ART

As a hitch carrier configured to load a bicycle, a hanging type that includes two arms is conventionally known. The hitch carrier with such a configuration puts the two arms through a triangle constituted with a top tube, a down tube, and a sheet tube as a bicycle frame, then secures the top tube with belts disposed on the respective arms.

As the hitch carriers related to such a configuration, structures disclosed in Patent Documents 1 and 2 are known. The hitch carrier disclosed in Patent Document 1 includes an arm disposed to extend laterally using a brace member as a base point. This brace member and the lateral arm include respective hangers for locking a bicycle. The basic configuration thereof is to support a top tube with the hanger disposed on the lateral arm and secure a sheet tube with the hanger disposed on the brace member.

The hitch carrier disclosed in Patent Document 2 includes a plurality of multifunctional brackets on one or two arms, which are put through to an empty space within a frame constituted with a top tube, a down tube, a sheet tube, and similar member. The basic configuration thereof is to sandwich and secure the top tube and the sheet tube with each of the multifunctional brackets.

Patent Document 1: U.S. Pat. No. 5,067,641
Patent Document 2: U.S. Pat. No. 5,573,165

DISCLOSURE OF THE INVENTION

Problems to be Solved by the Invention

The conventional hitch carrier with a configuration of disposing two arms horizontally in parallel has a problem that a bicycle is not loadable unless the bicycle includes a frame that is constituted to have a relatively large empty space within the frame and a straight top tube, therefore the versatility is poor.

Patent Document 2 discloses a configuration that ensures loading a bicycle even in the case where the empty space within the frame is small by including multifunctional brackets (cradles) that includes supporting portions at two positions on one arm. However, in this case, the multifunctional brackets possibly rotate using the arm as a base point, thus generating a problem in stably holding the bicycle.

Therefore, the objective of the present invention is to provide a hitch carrier that is highly versatile for a bicycle that is loadable and that ensures stable loading of a bicycle.

Solutions to the Problems

A hitch carrier according to the present invention to achieve the above-described objective is a hitch carrier for loading a bicycle including a frame that includes a top tube, a down tube, and a sheet tube. The hitch carrier includes a first arm engaged with a first cradle including a supporting portion that supports the top tube, a second arm engaged with a second cradle including a supporting portion that supports the down tube, and a post supporting in a cantilever manner both the first arm and the second arm separated in a vertical direction. Fastening belts are disposed on the first cradle and the second cradle to fasten the top tube and the down tube, respectively.

In the hitch carrier including a feature as described above, the first cradle and the second cradle include respective through holes that engage with the first arm and the second arm, and a plurality of the supporting portions disposed in a peripheral area using the through hole as a base point on an outer periphery in a direction intersecting with a direction where the through hole is formed. Respective distances between the through hole and the plurality of supporting portions are configured to be different.

Including such features allows changing of a loading height and a loading angle of the frame, which constitutes the bicycle, by rotating the cradle. In view of this, in the case where the plurality of bicycles are loaded, interference of a large width portion such as a handlebar and a pedal is avoidable.

In the hitch carrier including features as described above, the first arm and the second arm are preferred to include a turning mechanism configured to turn using a supporting portion of the post as a base point. Including such a feature allows the arms to be folded in the post side when in an unused state.

The hitch carrier including features as described above, preferably includes a link mechanism that links turning movements of the first arm and the second arm. Including such a feature allows switching of a used state and a stored state to be performed in one action. A mechanism for keeping a posture of the arm such as a locking mechanism is sufficient by being disposed on only one of the first arm or the second arm, thus simplifying the configuration.

Effects of the Invention

According to the hitch carrier including features as described above, a hitch carrier that is highly versatile for a bicycle that is loadable and that ensures stable loading of a bicycle can be constituted.

DESCRIPTION OF PREFERRED EMBODIMENTS

Figure 1:
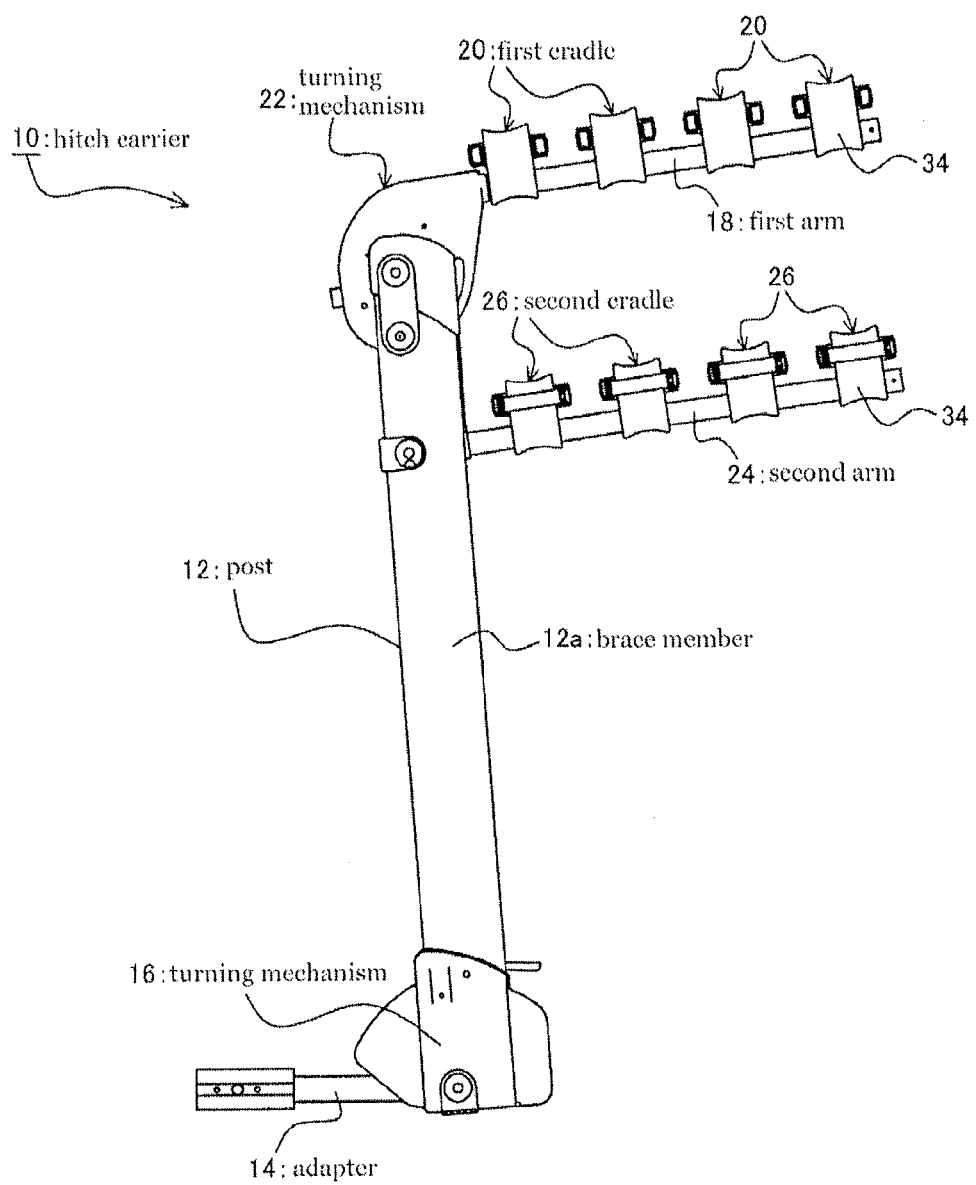
FIG. 1 is a diagram illustrating a configuration when a hitch carrier according to the embodiment is installed on a vehicle is viewed from a vehicle side surface.
Figure 2:
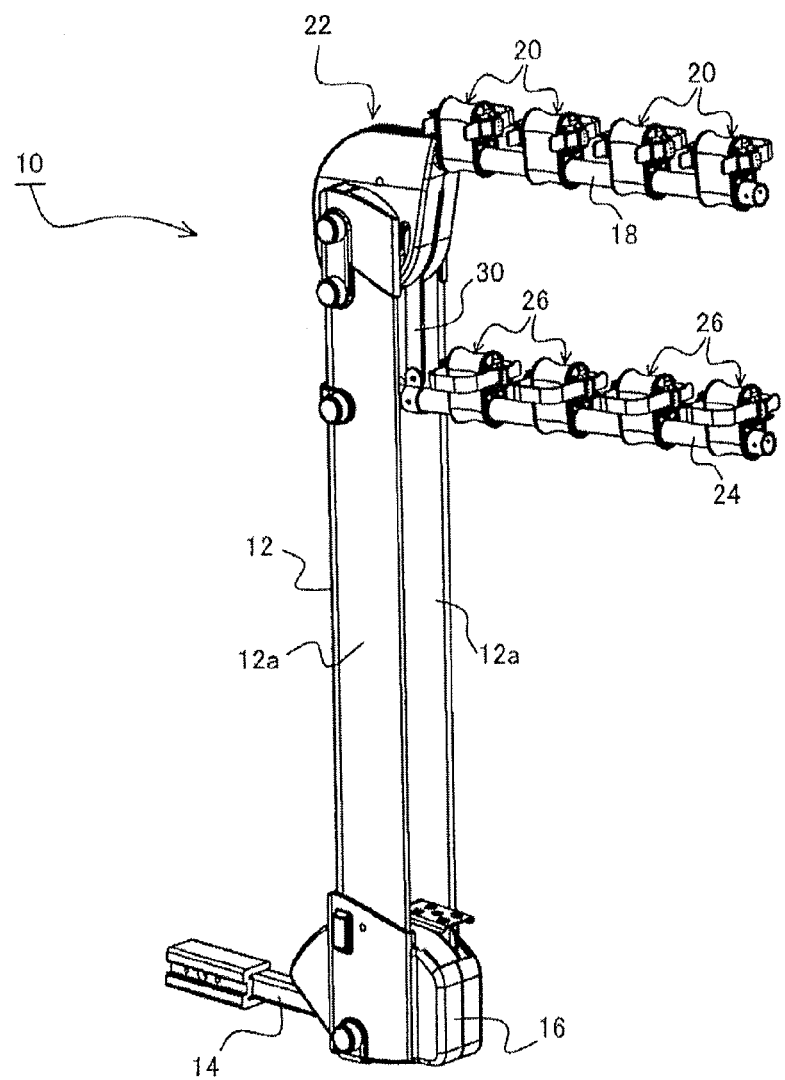
FIG. 2 is a perspective view illustrating the configuration of the hitch carrier according to the embodiment.

The following describes embodiments according to a hitch carrier of the present invention in detail with reference to the drawings. FIG. 1 is a diagram illustrating a configuration when a hitch carrier is installed on a vehicle is viewed from a vehicle side surface. FIG. 2 is a perspective view of the hitch carrier.

A hitch carrier 10 according to the embodiment is basically constituted with a post 12, a first arm 18, and a second arm 24. The post 12 is a member that supports the first arm 18 and the second arm 24 in a cantilever manner (supports one end portions of the first arm 18 and the second arm 24). The post 12 is connected to a rear of a vehicle via an adapter 14 (the vehicle is not illustrated). The post 12 includes a turning mechanism 16 having a locking function in a connecting portion with the adapter 14. In the used state, the post 12 keeps a state of being disposed standing upright to be approximately perpendicular with respect to the adapter 14, which is disposed to extend approximately horizontally to the rear of the vehicle, as illustrated in FIG. 1 and FIG. 2. On the other hand, a vehicle of a hatchback type cannot open a hatch with the post 12 standing upright. In view of this, when the hatch is opened, the post 12 is turned in a direction to which the adapter 14 is extended using the connecting portion with the adapter 14 as a base point. Therefore, the turning mechanism 16 has the locking function to prevent an unwanted turning in the used state.

The post 12 according to the embodiment is constituted with a pair of brace members 12a. The brace members 12a forming the pair are configured to sandwich the adapter 14, and the first arm 18 and the second arm 24, which will be described in detail later. With such a configuration, the configuration to store the first arm 18 and the second arm 24 between the brace members 12a forming the pair can be employed. Rotation axes 22d and 28 (see FIG. 3 and FIG. 4) to support the one end portions of the first arm 18 and the second arm 24 may be disposed so as to bridge across the brace members 12a forming the pair. Therefore, the rotation axes 22d and 28 can be stably held.

The first arm 18 is a support rod disposed on a top end side of the post 12. The first arm 18 includes a plurality of cradles (first cradles 20) engaged. The first arm 18 according to the embodiment is constituted with a cylindrical member or a columnar member, and its base end portion includes a turning mechanism 22 that serves as a connecting portion with the post 12.

Figure 3:
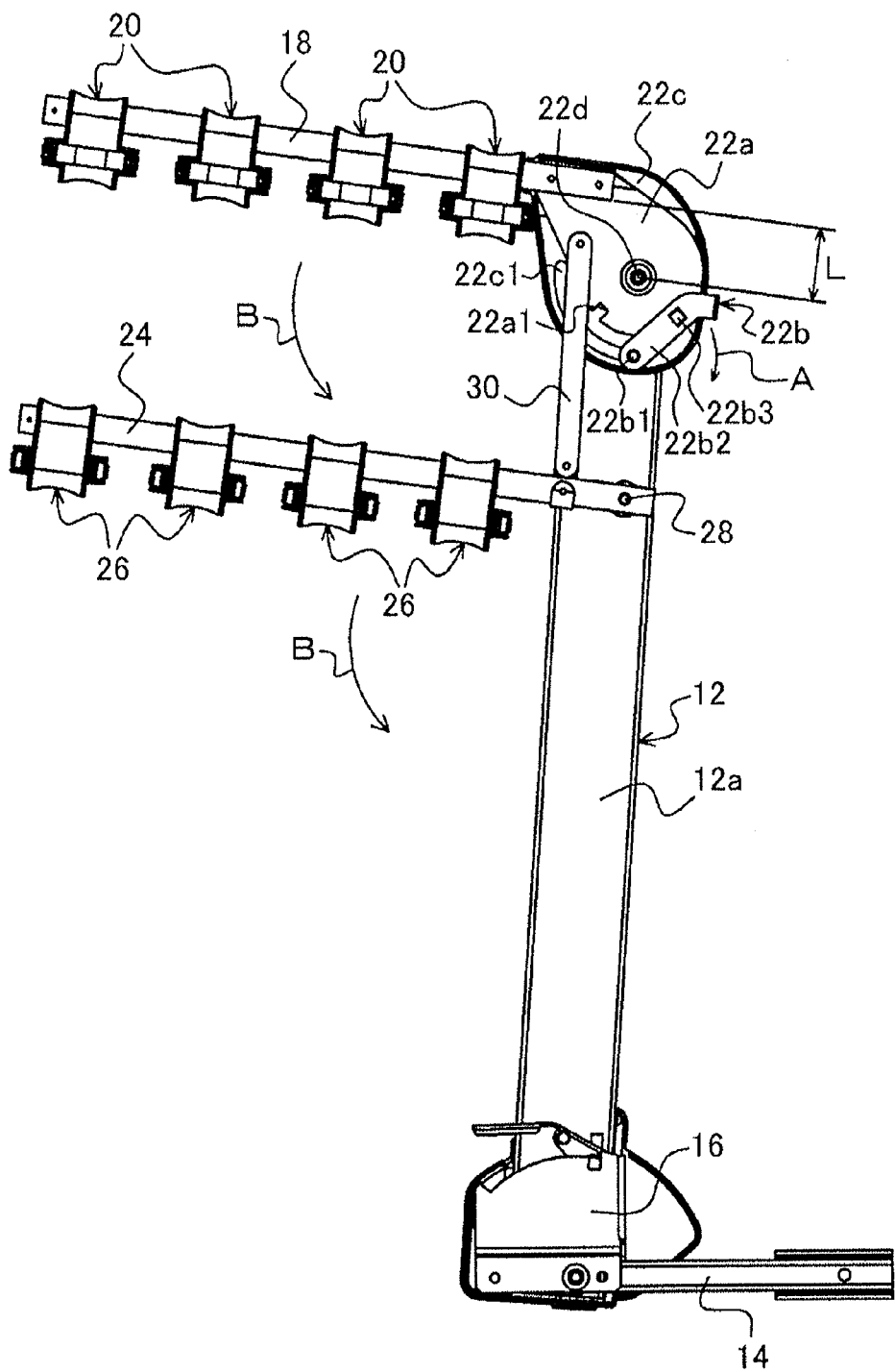
FIG. 3 is a partial cross-sectional view illustrating a used state in a state where a brace member that constitutes a post of the hitch carrier according to the embodiment is divided.
Figure 4:
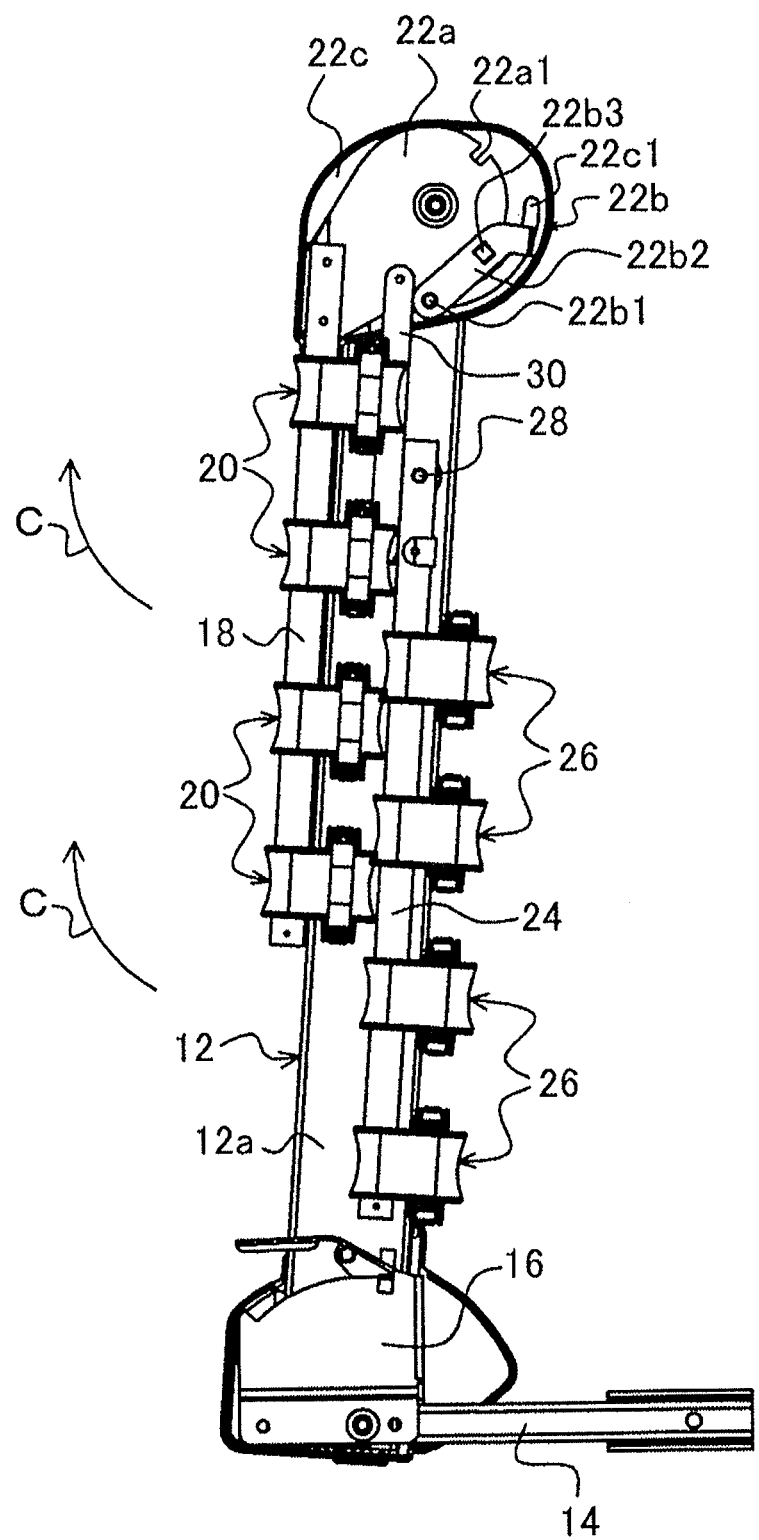
FIG. 4 is a partial cross-sectional view illustrating a stored state in a state where the brace member that constitutes the post of the hitch carrier according to the embodiment is divided.

The turning mechanism 22 is constituted with a turning member 22a, a locking means 22b, and a casing 22c as a main body, as the cross-sectional structures in FIG. 3 and FIG. 4 illustrate. The turning member 22a is a member that supports the one end portion of the above-described first arm 18 and supports its rotation and locking. A turning member 22a supports the first arm 18 in a state where the first arm 18 is shifted upward (a direction to which the post 12 extends) with respect to the rotation axis 22d for a shift amount L. Such a configuration ensures preventing interference between the first arm 18 and the second arm 24 when the first arm 18 and the second arm 24 are turned to be stored because positions of the first arm 18 and the second arm 24 are mutually shifted as illustrated in FIG. 4.

The turning member 22a includes a locking groove 22a1. Cooperating with the locking means 22b, which will be described later, ensures keeping a state where the first arm 18 is projected out (used state) or a state where the first arm 18 is folded (stored state).

The locking means 22b is a mechanism used for keeping the first arm 18 in the used state or the stored state as described above. In this embodiment, a lever 22b2 including a rotation axis 22b1 and a convex-shaped portion 22b3 included in this lever 22b2 constitute the locking means 22b. Here, the plurality of locking grooves 22a1 of the turning member 22a are formed toward a side of the rotation axis 22b1 on an outer periphery of the turning member 22a. Positions to form the locking grooves 22a1 are a portion where the convex-shaped portion 22b3 of the lever 22b2 positions when the first arm 18 is in the used state and a portion where the convex-shaped portion 22b3 of the lever 22b2 positions when the first arm 18 is in the stored state. The lever 22b2 preferably is biased to a side of the rotation axis 22d of the turning member 22a with, for example, a spring, which is not illustrated.

The casing 22c is a cover covering the turning member 22a, the first arm 18, the locking means 22b, or similar part. The casing 22c includes a guide groove 22c1 for avoiding interference with the rotation axis 22b1 of the lever 22b2 fixed to the brace member 12a.

Such a configuration ensures turning of the first arm 18 by turning the lever 22b2 in a direction of an arrow A to release an engagement of the locking groove 22a1 and the convex-shaped portion 22b3. When the first arm 18 turns to a predetermined position (a position in the used state or a position in the stored state), the convex-shaped portion 22b3 of the lever 22b2 biased to the rotation axis 22d side of the turning member 22a engages with the locking groove 22a1 formed in the predetermined position.

The second arm 24 is a support rod disposed on a base end side of the post 12 with respect to the first arm 18 described above. Therefore, the first arm 18 and the second arm 24 have their arrangement at upper and lower positions in the used state. The second arm 24 also includes a plurality of cradles (second cradles 26) engaged, similar to the first arm 18.

The second arm 24 according to the embodiment includes the rotation axis 28 on the one end portion, and includes a connecting member 30 in between with the turning member 22a supporting the one end portion of the first arm 18. Thus disposing the connecting member 30 can constitute a link mechanism that links a turning movement of the second arm 24 with a turning movement of the first arm 18. When the first arm 18 is in a locked state, the second arm 24 can also be in the locked state. In view of this, the second arm 24 has no necessity of including the locking means 22b, thus the configuration can be simplified.

The cradles (the first cradle 20 and the second cradle 26), which is engaged to the first arm 18 and the second arm 24, are not necessarily plural for both the first arm 18 and the second arm 24. The same number as the number of the bicycle loaded may be disposed each.

Figure 5:
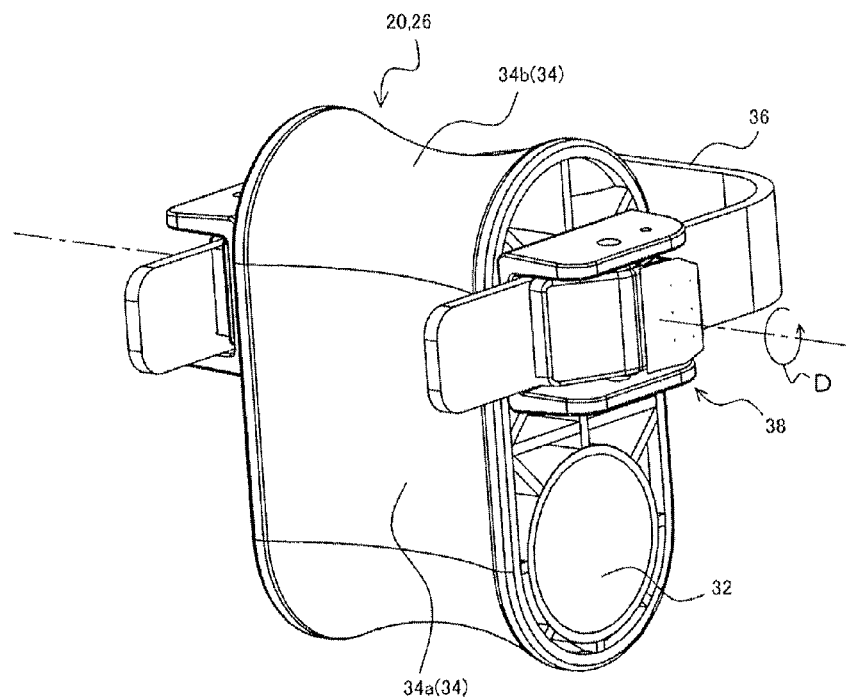
FIG. 5 is a perspective view illustrating a configuration of a cradle employed in the hitch carrier according to the embodiment.

The first cradle 20 and the second cradle 26 (hereinafter collectively and simply referred to as the cradles 20 and 26) basically include a through hole 32 and a supporting portion 34 (34a and 34b), and a fastening belt 36, as a perspective view in FIG. 5 illustrates. The through hole 32 is an engaging portion to engage with the above-described first arm 18 or second arm 24. The supporting portion 34 is a loading surface to support a top tube 52 (see FIG. 8) or a down tube 54 (see FIG. 8) of a bicycle 50 (see FIG. 7 and FIG. 8). The fastening belt 36 is a holding member that holds the top tube 52 or the down tube 54 loaded on the supporting portion 34 so as to prevent the top tube 52 or the down tube 54 from slipping from the loading surface.

The cradles 20 and 26 including such a basic element according to the embodiment have their side surface shaped in oval (track-like shape). On the side surface, the above-described through hole 32 is formed from one side surface toward the other side surface. The cradles 20 and 26 according to the embodiment include the through hole 32 that is formed being biased to one circular arc side of the oval-like shape. A whole outer peripheral surface connecting a pair of side surface, which forms the oval, constitutes the supporting portion 34 for supporting the bicycle. In view of this, the plurality of supporting portions 34 on the cradles 20 and 26 are arranged around the peripheral area using the center of the through hole 32 as the base point. The supporting portion 34, such as the supporting portion 34a and the supporting portion 34b, has a different distance from the center of the through hole 32 depending on its position. In view of this, the distance from the center of the through hole 32 (the first arm 18 or the second arm 24) to the supporting portion 34, that is, a height of the supporting portion 34 can be changed by rotating the cradles 20 and 26 engaged with the first arm 18 or the second arm 24 using the through hole 32 as the base point. This ensures changing of the height when the bicycle 50 (see FIG. 7 and FIG. 8) is loaded, thus preventing interference when the plurality of bicycles 50 are loaded.

The supporting portion 34 is constituted to have its center portion dent in a drum shape from the one side surface to the other side surface. Such a configuration improves a holdability of the frame (the top tube 52 or the down tube 54) when the bicycle 50 is loaded, and ensures the prevention of the frame slippage.

The circular arc side on the opposite side of the side where the through hole 32 is disposed in the cradles 20 and 26 includes a buckle 38 for fastening the fastening belt 36. The buckle 38 is disposed to form a pair on both the one side surface side and the other side surface side. The specific configuration of the buckle 38 does not matter as long as the configuration ensures the effective fastening of the fastening belt 36. The configuration may omit the buckle 38 itself as long as the configuration allows the frame in contact with the supporting portion 34 to be effectively held with the fastening belt 36. For example, in the case where the fastening belt is constituted with a member having a stretch property such as a rubber, it is not necessary to dispose the buckle 38 because the fastening belt 36 alone can fasten and hold.

Figure 6:
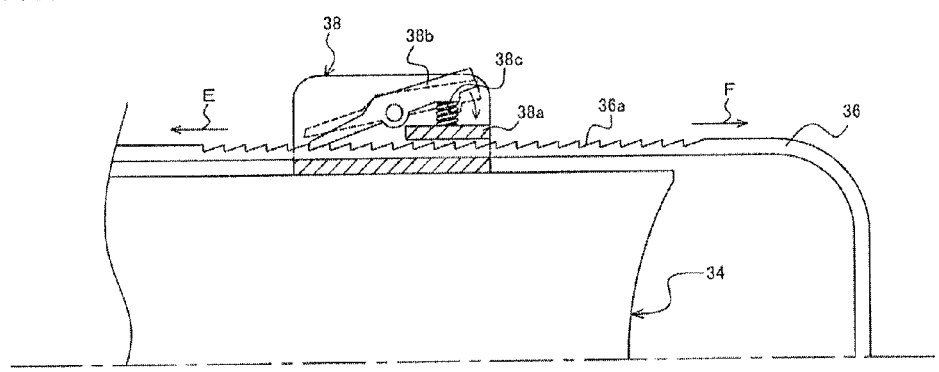
FIG. 6 is a diagram for describing an exemplary of a specific configuration of a fastening belt and a buckle that constitute the cradle.

On the other hand, in the case where a configuration includes the buckle 38, the following configuration, for example, may be employed. That is, in the case where a stopper 36a in a sawtooth shape is disposed in a fastening portion of the fastening belt 36 as illustrated in FIG. 6, the buckle 38 is preferably constituted to be in a ratchet shape having a base 38a, a lever 38b, a bias spring 38c, and similar part. Such a configuration enables a fastening belt 36 to be pulled only to a fastening side indicated by an arrow E when a leading end of the lever 38b of the buckle 38 is biased to the fastening belt 36 side, and when the fastening belt 36 is pulled to a loosening side (an arrow F side), an engagement occurs between the leading end of the lever 38b and the stopper 36a, thus the fastening belt 36 cannot be pulled. When the fastening belt 36 is loosen, pushing a rear end of the lever 38b to the fastening belt 36 side releases the engagement of the leading end and the stopper 36a.

The buckle 38 having the configuration as described above is turnable around the axis connecting the one side surface and the other side surface as indicated by an arrow D (see FIG. 5). Such a configuration enables the frame to be held even in the case where the position of the supporting portion 34, which contacts the frame, is changed in association with the rotation of the cradles 20 and 26 using the through hole 32 as a base point at each contacting position by turnably disposing the fastening belt 36 such that the fastening belt 36 straddles over the supporting portion 34 that is in contact with the frame.

The hitch carrier 10 having such a configuration allows the first arm 18 and the second arm 24 to be in the stored state by turning in a direction of an arrow B (see FIG. 3) or to be in the used state by turning in a direction of an arrow C (see FIG. 4), by turning the lever 22b2 of the locking means 22b in the direction of the arrow A as described above. In the stored state, the first arm 18 and the second arm 24, which include the plurality of cradles 20 and 26 engaged are stored in the post 12 constituted with the brace members 12a forming the pair, thus making the stored state compact.

Figure 7:
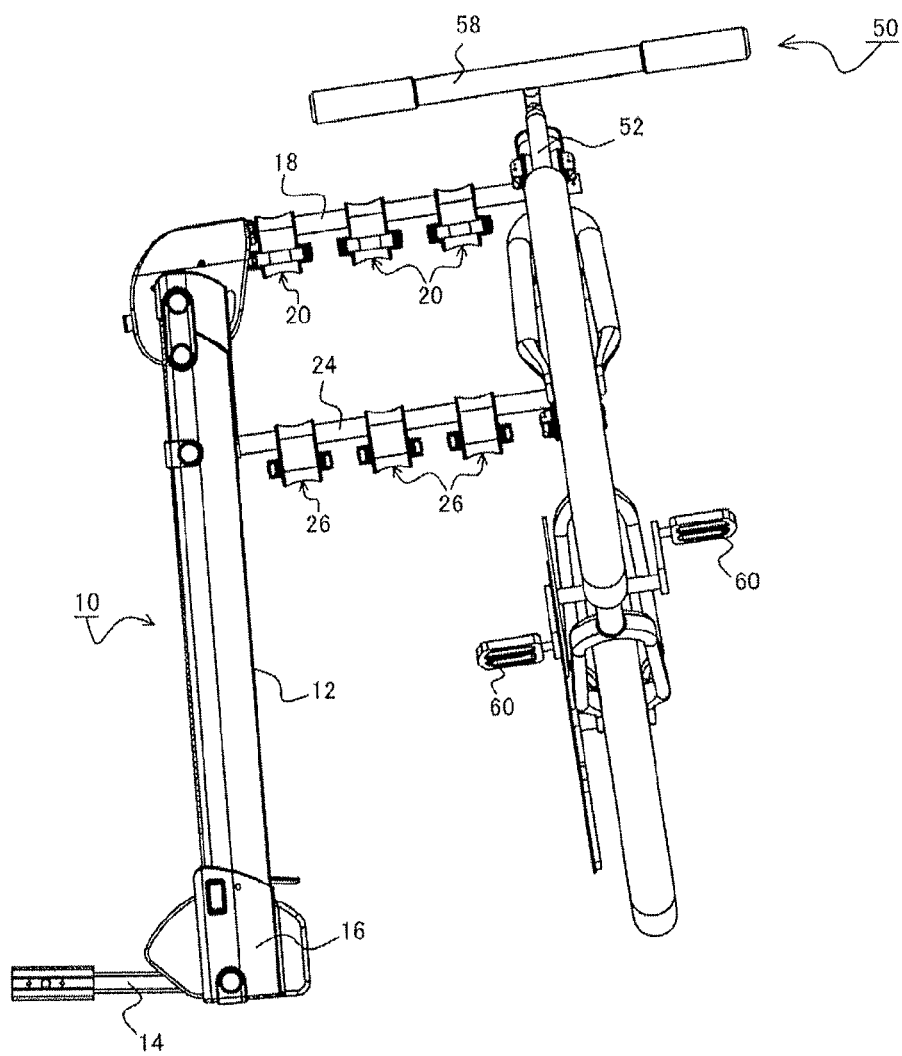
FIG. 7 is a diagram illustrating a configuration when the hitch carrier with a bicycle loaded is viewed from a vehicle side surface side.
Figure 8:
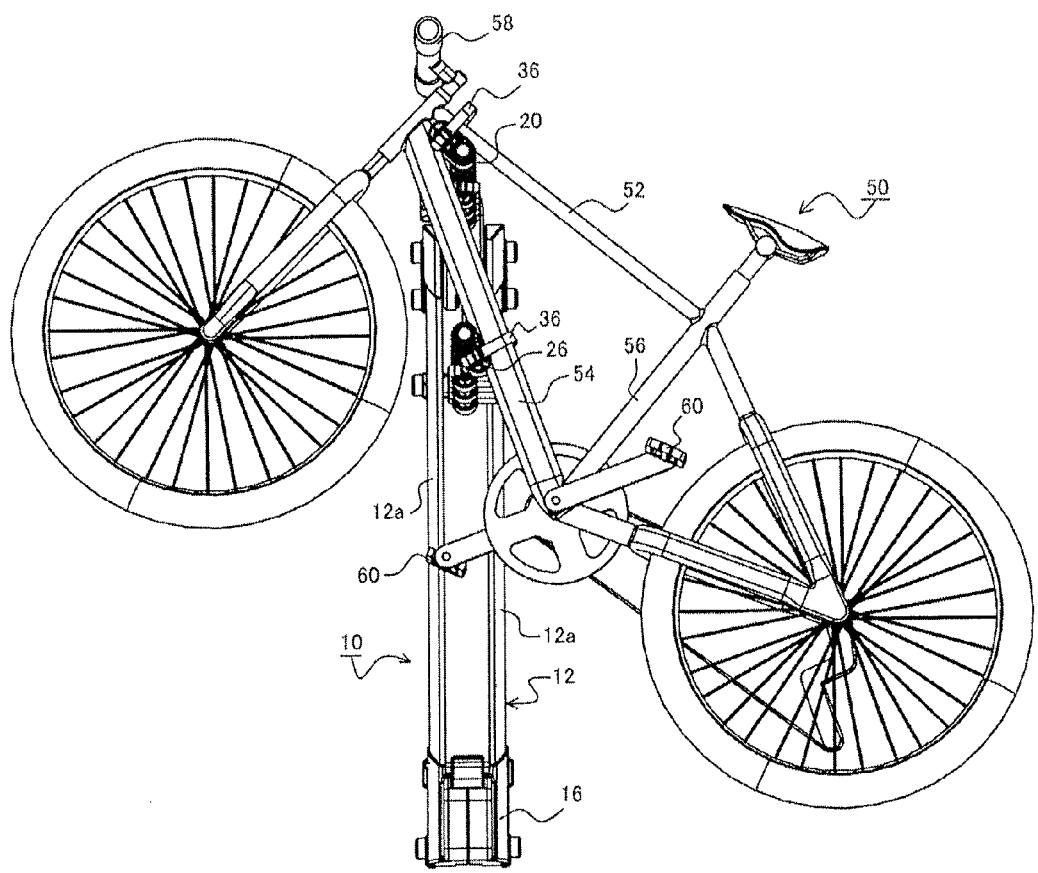
FIG. 8 is a diagram illustrating a configuration when the hitch carrier with the bicycle loaded is viewed from a vehicle rear side.

Next, loading of the bicycle using the hitch carrier as described above will be described with reference to FIG. 7 and FIG. 8. FIG. 7 is a diagram illustrating a state where the bicycle is loaded is viewed from the vehicle side surface side in a state where the hitch carrier 10 is installed on the vehicle. FIG. 8 is a diagram illustrating a state when viewed from the vehicle rear portion side.

The hitch carrier 10 according to the embodiment is basically loaded by the bicycle 50 including the frame forming a triangle with the top tube 52, the down tube 54, and a sheet tube 56 as illustrated in FIG. 8.

The first cradle 20 is located under the top tube 52, supports the top tube 52 with the supporting portion 34, and holds the top tube 52 with the fastening belt 36. The second cradle 26 is located under the down tube 54, supports the down tube 54 with the supporting portion 34, and holds the down tube 54 with the fastening belt 36.

The employed configuration holds the bicycle 50 by disposing only the first cradle 20 in the triangle constituted with the frame and supporting the down tube 54 with the second cradle 26 from outside the triangle. Thus the bicycle 50 with a frame having a small triangle constituted with the top tube 52, the down tube 54, and the sheet tube 56 can also be held. The configuration holds the frame of the bicycle 50 vertically by disposing the first cradle 20 and the second cradle 26 in a vertical direction, therefore a wobble of the loaded bicycle can be stopped.

Rotating the cradles 20 and 26 using the first arm 18 or the second arm 24 as the base point ensures changing a distance between the first arm 18 or the second arm 24 and the supporting portion 34. That is, a height and an angle to support the frame are changeable. In view of this, the loading height and angle of the frame are changeable in order to avoid the interference at a large width portion such as a handlebar 58 and a pedal 60 when the plurality of bicycles 50 are loaded.

While the hitch carrier 10 according to the embodiment is described that the first arm 18 and the second arm 24 are disposed to be in a vertical position, the vertical positions of the first arm 18 and the second arm 24 do not necessarily match one another, and may be disposed with a shift of approximately the width of the member constituting the arm. Such a configuration ensures avoiding the interference between the first arm and the second arm even in a case where the shift amount L is not disposed between the rotation axis 22d and the support position of the first arm.

The hitch carrier 10 according to the above-described embodiment employs the configuration that the first arm 18 and the second arm 24 are vertically disposed on the post 12, and the cradles 20 and 26 disposed on both the arms support and hold the frame, thus the bicycle 50 basically cannot shake in a front-rear direction of the vehicle (not illustrated).

However, a member to reduce the shaking of the bicycle 50 (wobble stop member) may be disposed separately from the cradles 20 and 26 in consideration of safety.

DESCRIPTION OF REFERENCE NUMERAL

10: hitch carrier, 12: post, 12a: brace member, 14: adapter, 16: turning mechanism, 18: first arm, 20: first cradle, 22: turning mechanism, 22a: turning member, 22a1: locking groove, 22b: locking means, 22b1: rotation axis, 22b2: lever, 22b3: convex-shaped portion, 22c: casing, 22c1: guide groove, 22d: rotation axis, 24: second arm, 26: second cradle, 28: rotation axis, 30: connecting member, 32: through hole, 34 (34a, 34b): supporting portion, 36: fastening belt, 36a: stopper, 38: buckle, 38a: base, 38b: lever, 38c: bias spring, 50: bicycle, 52: top tube, 54: down tube, 56: sheet tube, 58: handlebar, 60: pedal

The invention claimed is:

1. A hitch carrier for loading a bicycle including a frame that includes a top tube, a down tube, and a sheet tube, the hitch carrier comprising:
    a first arm engaged with a first cradle including a first cradle supporting portion that supports the top tube;
    a second arm engaged with a second cradle including a second cradle supporting portion that supports the down tube;
    a post supporting in an independent, cantilever manner both the first arm and the second arm separated in a vertical direction, the first arm and the second arm include a turning mechanism configured to turn using a supporting portion of the post as a base point; and
    a link mechanism that links the turning of the first arm and the second arm such that both the first arm and the second arm both turn together in the same direction using the linking mechanism, wherein
    the first cradle is located under the top tube and supports a position on the top tube, the first cradle contacts the top tube and the down tube with the first cradle supporting portion, and the second cradle is located under the down tube and supports the down tube with the second cradle supporting portion, and
    fastening belts are disposed on the first cradle and the second cradle to fasten the top tube and the down tube, respectively.

2. The hitch carrier according to claim 1, wherein:
    the first cradle and the second cradle include respective through holes that engage with the first arm and the second arm, and
    respective distances between the through hole and a supporting portion corresponding to the through hole is configured to be different.

3. The hitch carrier according to claim 1, wherein the first cradle is only connected to the first arm.

* * * * *